(12) United States Patent
Vanjani

(10) Patent No.: US 8,831,953 B2
(45) Date of Patent: Sep. 9, 2014

(54) SYSTEMS AND METHODS FOR FILTERING OBJECTIONABLE CONTENT

(71) Applicant: Vikas Vanjani, Newport Beach, CA (US)

(72) Inventor: Vikas Vanjani, Newport Beach, CA (US)

( * ) Notice: Subject to any disclaimer, the term of this patent is extended or adjusted under 35 U.S.C. 154(b) by 0 days.

(21) Appl. No.: 14/151,649

(22) Filed: Jan. 9, 2014

(65) Prior Publication Data

US 2014/0200893 A1 Jul. 17, 2014

Related U.S. Application Data

(60) Provisional application No. 61/753,164, filed on Jan. 16, 2013.

(51) Int. Cl.
*G10L 21/00* (2013.01)
*G10L 15/183* (2013.01)

(52) U.S. Cl.
CPC .................. *G10L 15/183* (2013.01)
USPC .................. 704/270; 704/1; 704/9

(58) Field of Classification Search
USPC ........................... 704/1, 9, 10, 270
See application file for complete search history.

(56) References Cited

U.S. PATENT DOCUMENTS

| | | | |
|---|---|---|---|
| 6,075,550 A | 6/2000 | Lapierre | |
| 6,166,780 A | 12/2000 | Bray | |
| 6,493,744 B1 | 12/2002 | Emens et al. | |
| 7,139,031 B1 | 11/2006 | Bray | |
| 7,437,290 B2 | 10/2008 | Danieli | |
| 7,912,716 B2* | 3/2011 | McCuller | 704/254 |
| 7,917,352 B2 | 3/2011 | Seto | |
| 8,108,398 B2* | 1/2012 | Guday et al. | 707/739 |
| 8,117,282 B2 | 2/2012 | Jarman et al. | |
| 8,473,281 B2* | 6/2013 | Maude et al. | 704/9 |
| 8,515,736 B1* | 8/2013 | Duta | 704/9 |
| 2005/0010952 A1 | 1/2005 | Gleissner et al. | |
| 2009/0055189 A1* | 2/2009 | Stuart et al. | 704/270 |
| 2011/0087485 A1* | 4/2011 | Maude et al. | 704/9 |
| 2011/0302123 A1* | 12/2011 | Nista et al. | 706/52 |
| 2013/0090917 A1* | 4/2013 | Chalmers et al. | 704/9 |
| 2013/0253914 A1* | 9/2013 | Maude et al. | 704/9 |

FOREIGN PATENT DOCUMENTS

CA 2621952 9/2009

OTHER PUBLICATIONS

Pandora Help, accessed from Pandora.com on Dec. 5, 2013.
"The New TV Guardian LT Profanity Filter for both HDTV and older TVs", TV Guardian home page, accessed from tvguardian.com on Dec. 5, 2013.
"Profanity Content Filter on DJ Intelligence Music Search", Innovative LED Stage & DJ Lighting, Mobile Beat Magazine Online, accessed on http://www.mobilebeat.com/profanity-content-filter-on-dj-intelligence-music-search/ on Dec. 5, 2013.

\* cited by examiner

*Primary Examiner* — Douglas Godbold
(74) *Attorney, Agent, or Firm* — Knobbe Martens Olson & Bear LLP

(57) ABSTRACT

Systems and methods for filtering media containing objectionable content are described. Marker files that list the times objectionable content occurs in audio content (such as a song, podcast, audio associated with a video or television program, or the like) can be stored in a user device. When a user plays audio content for which a marker file exists, the system can automatically filter out the objectionable content marked in the marker file from playback of the audio content. The system may also provide functionality for the user to specify a level of filtering to be applied or even specific words to be filtered from audio content.

24 Claims, 15 Drawing Sheets

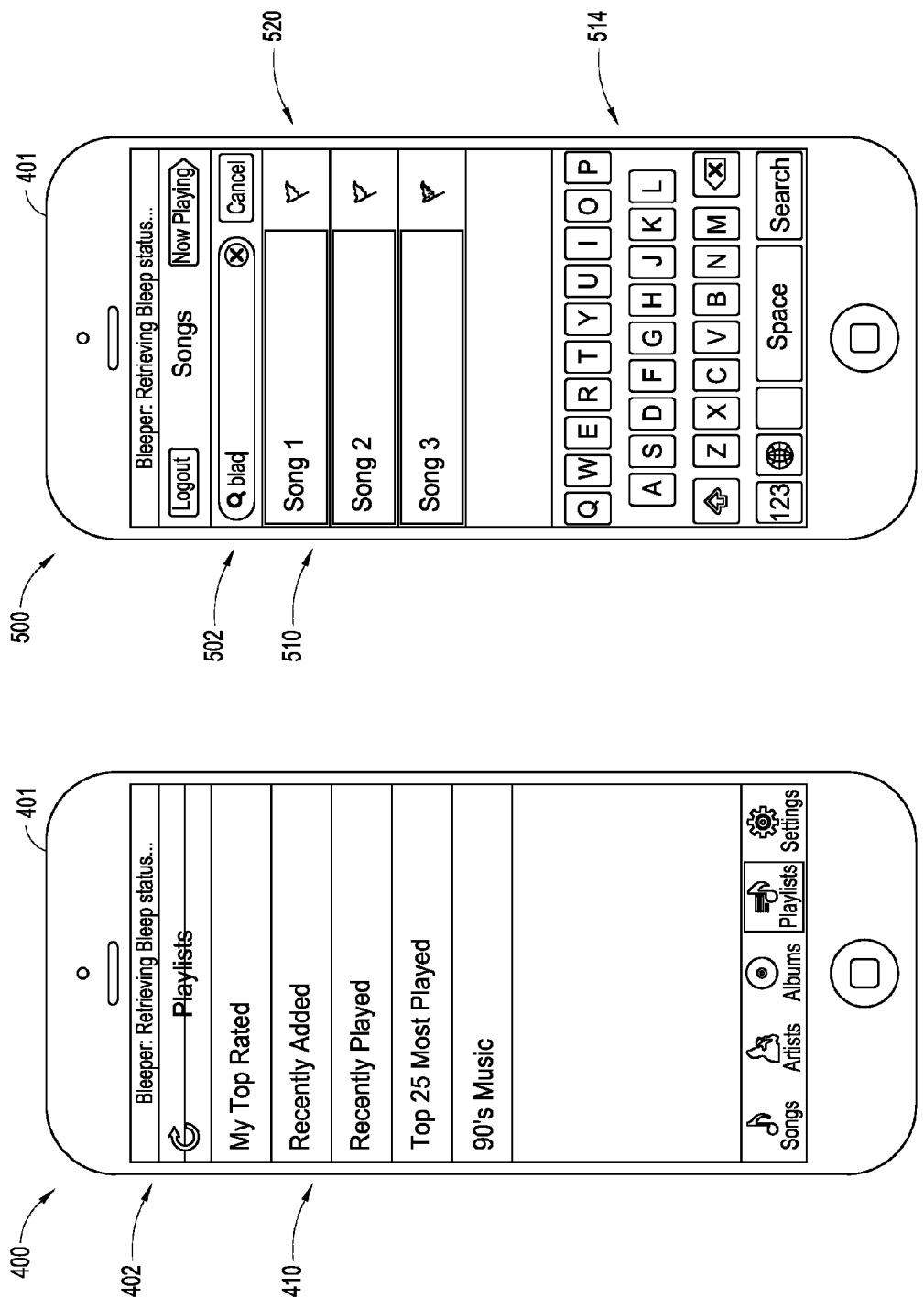

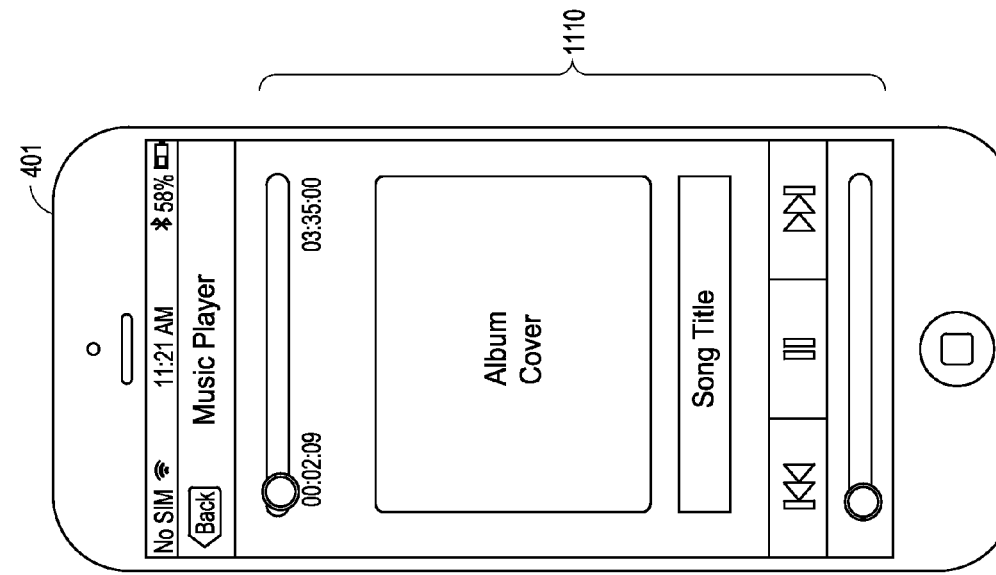
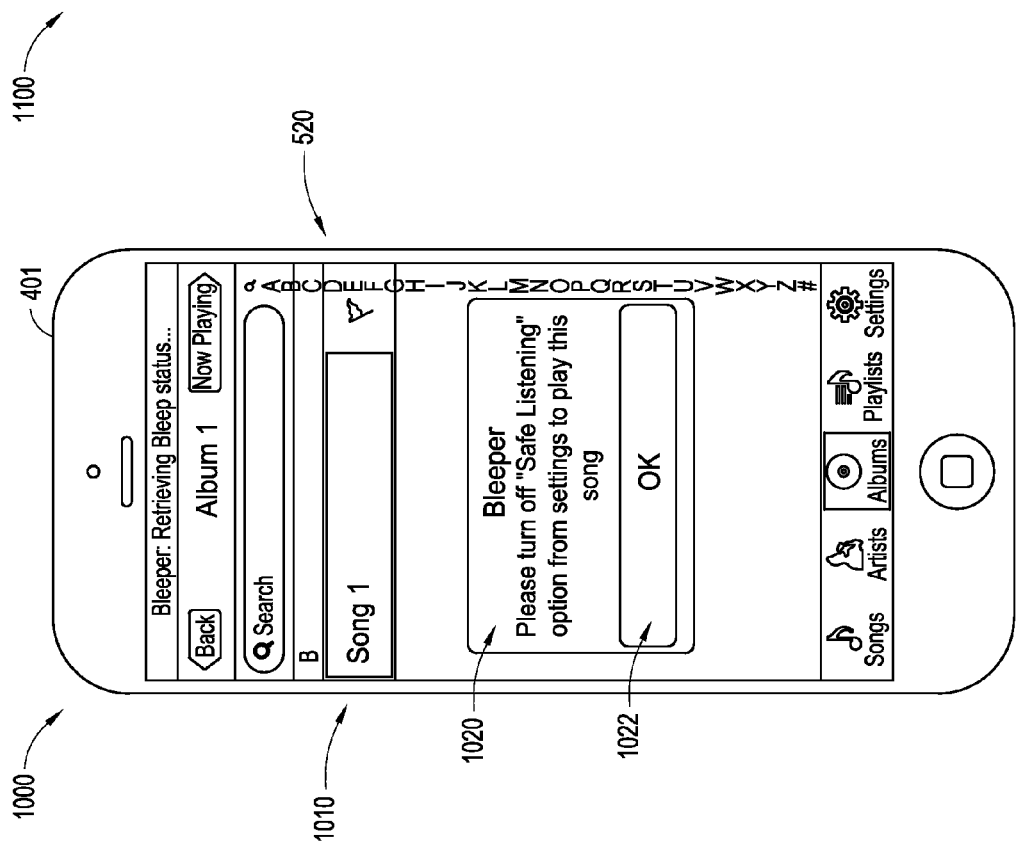
FIG. 11
FIG. 10

| Song name | Artist Name | Objectionable Words | Start Time | End Time | Duration |
|---|---|---|---|---|---|
| song 1 | artist 1 | word 1 | 1:08:05 | 1:09:02 | 0:00:07 |
| song 1 | artist 1 | word 2 | 1:26:05 | 1:27:00 | 0:00:05 |
| song 1 | artist 1 | word 3 | 4:02:01 | 4:02:07 | 0:00:06 |
| song 1 | artist 1 | word 4 | 4:07:08 | 4:08:03 | 0:00:05 |
| song 1 | artist 1 | word 5 | 2:46:09 | 2:47:05 | 0:00:06 |
| song 1 | artist 1 | word 6 | 3:48:04 | 3:49:01 | 0:00:07 |
| song 2 | artist 2 | word 1 | 0:47:00 | 0:47:05 | 0:00:05 |
| song 2 | artist 2 | word 2 | 1:57:08 | 1:58:04 | 0:00:06 |
| song 2 | artist 2 | word 3 | 2:14:00 | 2:14:07 | 0:00:07 |
| song 2 | artist 2 | word 4 | 1:35:01 | 1:35:05 | 0:00:04 |
| song 2 | artist 2 | word 5 | 1:44:01 | 1:44:05 | 0:00:04 |
| song 2 | artist 2 | word 6 | 1:52:08 | 1:53:02 | 0:00:04 |
| song 2 | artist 2 | word 7 | 2:22:06 | 2:23:01 | 0:00:05 |
| song 2 | artist 2 | word 8 | 0:06:08 | 0:07:06 | 0:00:08 |
| song 2 | artist 2 | word 9 | 0:51:08 | 0:52:03 | 0:00:05 |

*FIG. 18*

| Logo | | | | dan@email.com Logout |
|---|---|---|---|---|

User Management

Accounts

Showing 1 - 10 of 10 | Display [10 ▼]    3 selected [Deleted] [Print]

| All ☐ | Name ▼ | Date Created ▼ | Email | |
|---|---|---|---|---|
| ☑ | Account Name | 11/12/2012 | user@gmail.com | edit  delete |
| ☐ | Account Name | 11/12/2012 | user@gmail.com | |
| ☑ | Account Name | 11/12/2012 | user@gmail.com | |
| ☐ | Account Name | 11/12/2012 | user@gmail.com | |
| ☑ | Account Name | 11/12/2012 | user@gmail.com | |
| ☐ | Account Name | 11/12/2012 | user@gmail.com | |
| ☐ | Account Name | 11/12/2012 | user@gmail.com | |

Showing 1 - 10 of 10    Go to page: [    ] [GO]    ◄First [1] [2] [...] [7] [8] Last►    3 selected [Delete] [Print]

*FIG. 20*

SYSTEMS AND METHODS FOR FILTERING OBJECTIONABLE CONTENT

RELATED APPLICATIONS

This application claims priority under 35 U.S.C. §119(e) as nonprovisional applications of the U.S. Provisional Application No. 61/753,164, filed Jan. 16, 2013, the disclosure of which is hereby incorporated by reference in its entirety.

BACKGROUND

Content media such as commercially produced songs and movies often have content that is offensive or otherwise objectionable to different viewers. This objectionable content might include objectionable language, such as swears, sexual references, references to drug or alcohol abuse, and the like. Objectionable content in the movie or television context might also include objectionable scenes, such as violent, sexual, or drug or alcohol abuse scenes, among others. Thus, rather than viewing or listening to the objectionable content, users will often manually turn off the playback of content media containing material that they find to be offensive.

SUMMARY

In certain embodiments, a system for filtering objectionable content from audio includes a preferences module that can output a user interface having functionality for a user to specify first objectionable terms to filter out from audio playback, and a language filtering client implemented at least in part by a hardware processor. The language filtering client can receive a user selection of an audio content item to be played and access a marker file associated with the audio content item. The marker file can include an indication of second objectionable terms used in the audio content item. The second objectionable terms can include one or more of the first objectionable terms. Further, the language filtering client can cause playback of the audio content item to occur while filtering out the one or more first objectionable terms from the audio content item based on timing information associated with the second objectionable terms stored in the marker file.

In some embodiments, non-transitory physical computer storage is provided that includes instructions stored thereon that, when implemented by a hardware processor, cause the hardware processor to implement a system for filtering objectionable content from audio. The system can output a user interface having functionality for a user to specify first objectionable terms to filter out from audio playback. The system can also receive a user selection of an audio content item to be played back and access a marker file associated with the audio content item. The marker file can include an indication of second objectionable terms used in the audio content item. The second objectionable terms can include one or more of the first objectionable terms. The system can also cause playback of the audio content item to occur while filtering out the one or more first objectionable terms from the audio content item based on timing information associated with the second objectionable terms stored in the marker file.

In various embodiments, a method of filtering objectionable content from audio can be performed under control of a physical computing device having digital logic circuitry. The method can include receiving an identification of user-specified objectionable content to be filtered from media playback. The method can also include receiving a user selection of audio content for playback and identifying whether a marker file is associated with the audio content. In response to determining that the marker file is not associated with the audio content, the method can perform one or both of outputting an indication to the user and preventing playback of the song. In response to determining that the marker file is associated with the audio content, the method can play back the song while filtering the user-specified objectionable content from the song responsive to data stored in the marker file.

Moreover, in certain embodiments, a method of filtering objectionable content from audio can be implemented under control of a physical computing device having digital logic circuitry. The method can receive an identification of user-specified objectionable terms to be filtered from media playback, receive a user selection of audio content for playback, determine whether the audio content includes objectionable terms, and in response to determining that the audio content includes the objectionable terms, play back the song while filtering the user-specified objectionable content from the song.

For purposes of summarizing the disclosure, certain aspects, advantages and novel features of several embodiments are described herein. It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

BRIEF DESCRIPTION OF THE DRAWINGS

Throughout the drawings, reference numbers are re-used to indicate correspondence between referenced elements. The drawings are provided to illustrate embodiments of the features described herein and not to limit the scope thereof.

FIGS. 4 through 15 depict example language filtering client user interfaces.

FIG. 18 depicts an example marker file.

FIG. 20 depicts an example administration user interface.

DETAILED DESCRIPTION

I. Introduction

Figure 1:
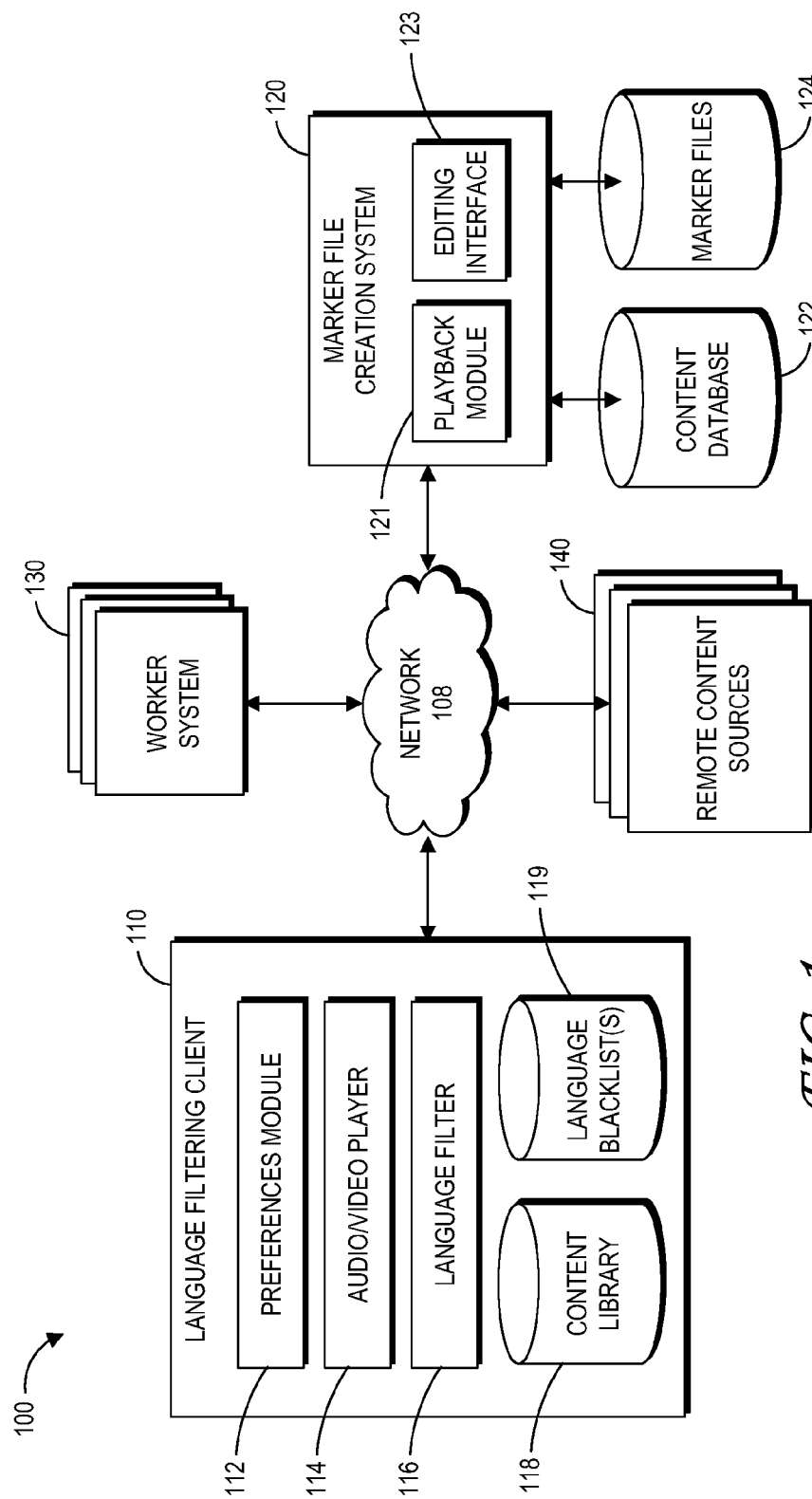
FIG. 1 depicts an example computing environment for implementing an objectionable content filter.

Many users miss out on interesting content that they would prefer to listen to or watch save for the objectionable content contained therein. Often, a song or video is objectionable only in part. In such situations, some users would like to still view or listen to the content media so long as the objectionable portions are filtered or removed. For example, viewers that find an "R" rated movie to be objectionable, may view a PG or PG-13 version of the movie. Likewise, if a song has a couple of offensive words, listeners may be willing to listen to the song if the words are removed. As a result, more users would likely view or listen to a work if content filtering could reduce or eliminate user-specific objectionable content.

The features described herein relates to systems and methods for filtering media containing objectionable content. In one embodiment, marker files that list the times objectionable content occurs in audio content (such as a song, podcast, audio associated with a video or television program, or the like) are stored in a user device. When a user plays audio content for which a marker file exists, the system can automatically filter out the objectionable content marked in the marker file from playback of the audio content. The system may also provide functionality for the user to specify a level of filtering to be applied or even specific words to be filtered from audio content.

In another embodiment, the system scans textual files containing the lyrics of popular songs or the words used in a video. The system then blocks or changes potentially offensive content existing within the songs and video. Textual files may be created for a library of content such as songs and/or video. The textual files may contain the lyrics, words and phrases that are used in the content. A user can then separately identify the words and phrases that the user finds to be objectionable or offensive. The user can do so by entering a list of offensive words into a user interface, selecting predefined lists, or selecting categories of offensive language. In yet another embodiment, a user can tag a particular word or phrase that the user finds objectionable. Before the system plays a particular content, the system can scan the textual file associated with the content to determine whether there is any offensive language. In one embodiment, if a song has the offensive language, the system blocks the playback of the song.

In another embodiment, the textual files also contain the location of the offensive language within the content. In this embodiment, the system allows playback of the content, but filters the offensive language based on the location of the offensive language in the content. In yet another embodiment, the system automatically determines, such as with voice recognition software or collective user input, where the offensive language occurs in the audio stream and skips, silences, bleeps, or otherwise overrides the offensive language during playback of the content or blocks playback of the content.

The system can be server-based, implemented in a user device, or have both server and user-device components. For example, the filtering software can be resident in a mobile device and implemented by a hardware processor comprising digital logic circuitry. Alternatively, the software can be located in a physical computer server such that the server filters the content before broadcasting the content to the user. Other example user device and server features are described in greater detail below with respect to the FIGURES.

II. Example Computing Environment

FIG. 1 depicts an embodiment of a computing environment 100 in which filtering of objectionable content may be performed. The computing environment 100 includes a language filtering client 110 that can be implemented in a user computing device such as a smartphone, cell phone, laptop, desktop, tablet, or the like. The language filtering client 110 communicates over a network 108 with a marker file creation system 120 as well as optionally remote content resources 140. The network 108 may be a local area network (LAN), a wide area network (WAN), the Internet, an Intranet, combinations of the same, or the like. Further, worker systems 130 communicate with the marker file creation system 120 over the network 108. The worker systems 130 may also be any computing device, such as a smartphone, cell phone, laptop, desktop, tablet, or the like. Each of these systems are described in greater detail below.

Advantageously, in certain embodiments, the language filtering client 110 can filter objectionable content in songs, video (including films, television, online videos, etc., whether stored in storage media or streamed online), and other audio programs (such as podcasts). For convenience, however, the remainder of this specification will refer to songs as an example embodiment of content that may be filtered. It should be understood that any of the features described herein with respect to songs may be equally applied to the other types of content described herein.

In the depicted embodiment, the language filtering client 110 includes a preferences module 112, an audio/video player 114, a language filter 116, a content library 118, and a language blacklist data store 119. Any of the components shown in the language filtering client 110 can be implemented in computer hardware such as for example a hardware processor comprising digital logic circuitry. The language filtering client 110 may, for instance, be loaded in the memory of a user device (not shown) and may be executed by a hardware processor of the user device. The language filtering client 110 can be an application or app that may be downloaded from an application or app store such as the Apple iTunes™ app store, the Google Play™ store, the Amazon™ app store, or the like. The language filtering client 110 may instead be a web browser that downloads one or more web pages from a website or other network resources that include the functionality of the modules and components shown in the language filtering client 110.

By way of overview, the preferences module 112 can provide one or more user interfaces that allow a user to select settings associated with the language filter 116. For instance, the preferences module 112 can provide options for a user to select the level of filtering to apply to songs or other content or specific words that are to be filtered. The preferences module 112 may, for instance, provide functionality for a user to select or type in words that are objectionable to that user, which the language filter 116 can subsequently filter out of any songs played with the audio/video player 114. The audio/video player 114 can play any song stored in the content library 118. The player 114 may alternatively access a streaming media source at the remote content sources 140 over the network 108 (such as an Internet radio source like Pandora™).

The audio/video player 114 can provide a user interface that includes functionality for a user to start, stop, pause, or otherwise control playback of a song. The language filter 116 can filter language in a song being played by the audio/video player 114 based on one or more language blacklists stored in the data store 119 and the preferences set by the user with the preferences module 112. The features of the player 114 may be incorporated in the language filter 116 in one embodiment.

By way of overview, the language filter 116 can download one or more marker files from the marker file creation system 120. A marker file may include information about objectionable words that occur in a song currently being played (or about to be played) by the audio/video player 114. Accordingly, the language filter 116 can use the data in the marker file to identify which words to filter out of playback by the audio/video player 114. The marker file may include, for instance, not only the objectionable words that occur in a particular song but also the start and stop time of the objectionable word in the song, the duration of the objectionable word, or the like. A marker file can correspond to one song, such that the language filter 116 downloads multiple marker files, or a single marker file can include objectionable content data regarding a plurality of songs. Marker files may also be organized based on album (such as one marker file per album) or artist (such as one marker file per artist) or playlist (such as one marker file per playlist).

The language filter 116 can also store an index of songs or a list of songs in the content library 118 for which corresponding marker files or data in a single marker file is stored in the content library 118. When a user attempts to access a song with the audio/video player 114, the language filter 116 can determine whether a marker file exists in the content library 118 for that song (e.g., by checking to see if the song is on the list or index). If the marker file exists or is otherwise associated with the song, the language filter 116 can enable playback. In contrast, sometimes the marker file is not available for a particular song or the data corresponding to that song is not in a single marker file. If the user has selected a safe mode in the preferences module 112, the language filter 116 can prevent playback of the song or otherwise inform the user that in order to play back the song the user must disable the safe mode setting.

The marker file creation system 120 can be implemented using one or more physical or virtual servers, which may be physically co-located or geographically dispersed. The marker file creation system 120 can therefore be implemented at least in part by physical computer hardware, such as a hardware processor comprising digital logic circuitry. The marker file creation system 120 can also be implemented on a cloud hosting platform or a platform as a service, such as any of the services provided by Amazon Web Services™, Microsoft Azure™, Rackspace™, or the like.

The marker file creation system 120 can be accessed by the worker systems 130 to create marker files for songs. The worker systems 130 can be geographically collocated or geographically dispersed. The worker systems 130 may be used by workers that are outsourced to different areas including workers in foreign countries or workers that speak a foreign language, which can create marker files for songs in different languages.

The marker files may be stored as comma delimited files (e.g., CSV files), text files, files in a database, or the like. The marker files may include information about songs, artists, albums, words used, start or stop times where objectionable content occurs, durations of objectionable content occurrences, and the like. Accordingly, the marker file creation system 120 can include a playback module 121 that plays back songs stored in a content database 122 and an editing interface 123 that outputs a user interface having tools or functionality for the worker systems 130 to create the marker files, which are then stored in the marker file database 124. The editing interface 123 can include in the user interface tools for selecting words in the songs, can output a list of the lyrics associated with those songs, and can enable a worker to select start and stop times and/or durations of objectionable content occurring in those songs.

The tools provided by the playback module 121 and the editing interface 123 may be web-based in an embodiment, accessible from a browser of the worker systems 130. Alternatively, the worker systems 130 each include a thick client program that downloads the songs and which provides tools for playback, editing marker files, and uploading marker files to the marker file creation system 120.

In an embodiment, the marker file creation system 120 stores a master marker file in the marker file database 124. The master marker file can include a list of all the objectionable content that has been detected by the worker systems 130 for a plurality of songs. The master marker file can represent most or all objectionable words in a particular language that have been identified by workers and/or that have been accessed programmatically (or inputted manually) from dictionary sources (including standard dictionaries such as dictionary.com and slang dictionaries such as urbandictionary.com)). The master file can be added to or changed by operation of the workers via the editing interface 123. For instance, any time a worker identifies a new objectionable word in an individual song, the worker may mark that word in an individual marking file using the editing interface 123, and the marker file creation system 120 can subsequently update the master marking file to include the new word. Workers may subsequently browse the master marking file to determine whether words in song they edit are objectionable.

The content database 122 of the marker file creation system 120 can include licensed songs or other content, text lyrics, and the like. Lyrics in text form can be accessed by worker systems 130 while creating or editing marker files so that workers do not have to guess at lyrics while listening to content. Alternatively, lyric files may be omitted. Further, lyric files can be obtained by the marker file creation system 120 automatically for any song via the remote content sources 140. As described above, the remote content sources 140 can include a lyrics database or the like, which may be publicly or commercially accessible.

III. Example Processes

Figure 2:
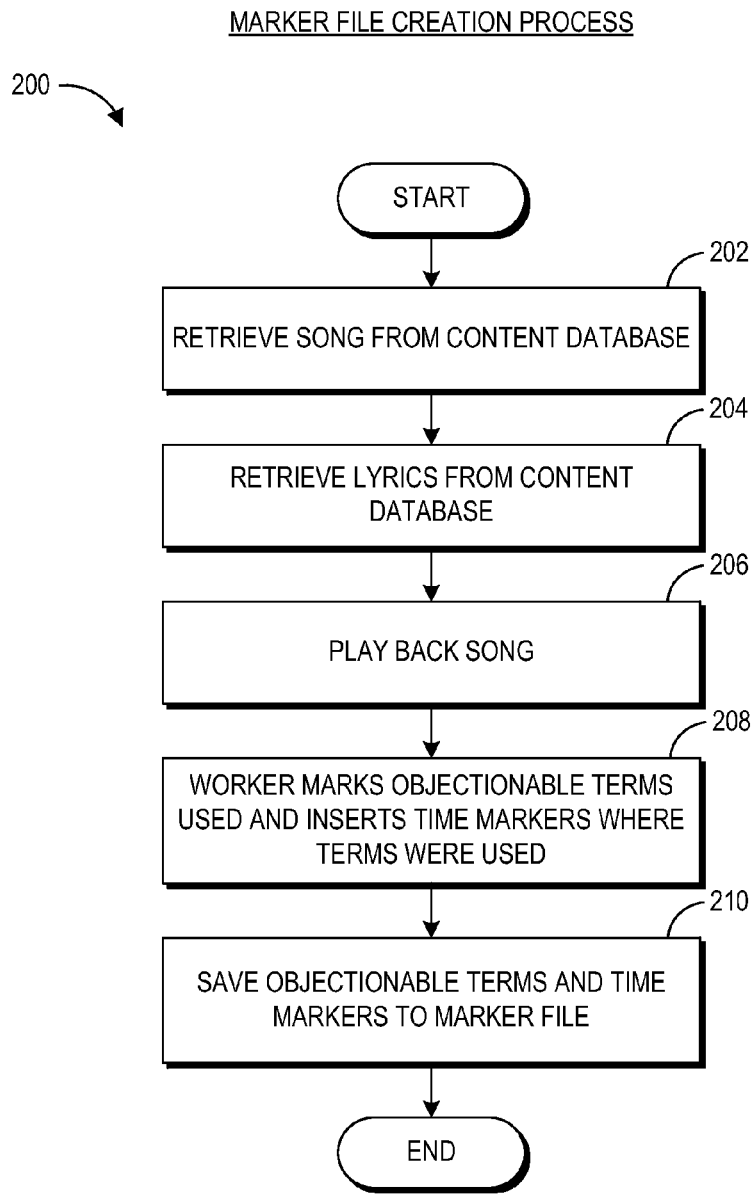
FIG. 2 depicts an example marker file creation process.

Turning to FIG. 2, an example marker file creation process 200 is shown. The marker file creation process 200 may be implemented using components of the computing environment 100 described above, although it is not limited as such and may be implemented by any computing device. However, for convenience, the marker file creation process 200 as described in the context of the marker file creation system 120. Workers using worker systems 130 can access the marker file creation system 120 as described above to implement the marker file creation process 200 shown.

At block 202, a song is retrieved from the content database 122 by a worker system 130 using the marker file creation system 120. At block 204, the worker retrieves lyrics from the content database 122 (or from a remote data source 140). This retrieval of lyrics can be manually performed by the user selecting a song and obtaining its lyrics from the database or automatically by the marker file creation system 120, accessing the lyrics from a remote content source 140 as described above.

At block 206, the marker file creation system 120 plays back the song or alternatively downloads the song to the worker system 130, which play back the song. The worker marks objectionable terms used in the song and inserts time markers where the terms were used at block 208, which can be used to create the marker file to be downloaded to the language filtering client 110. At block 210, objectionable terms and time markers can be saved to the marker file (including optionally to the master marker file described above).

Figure 3A:
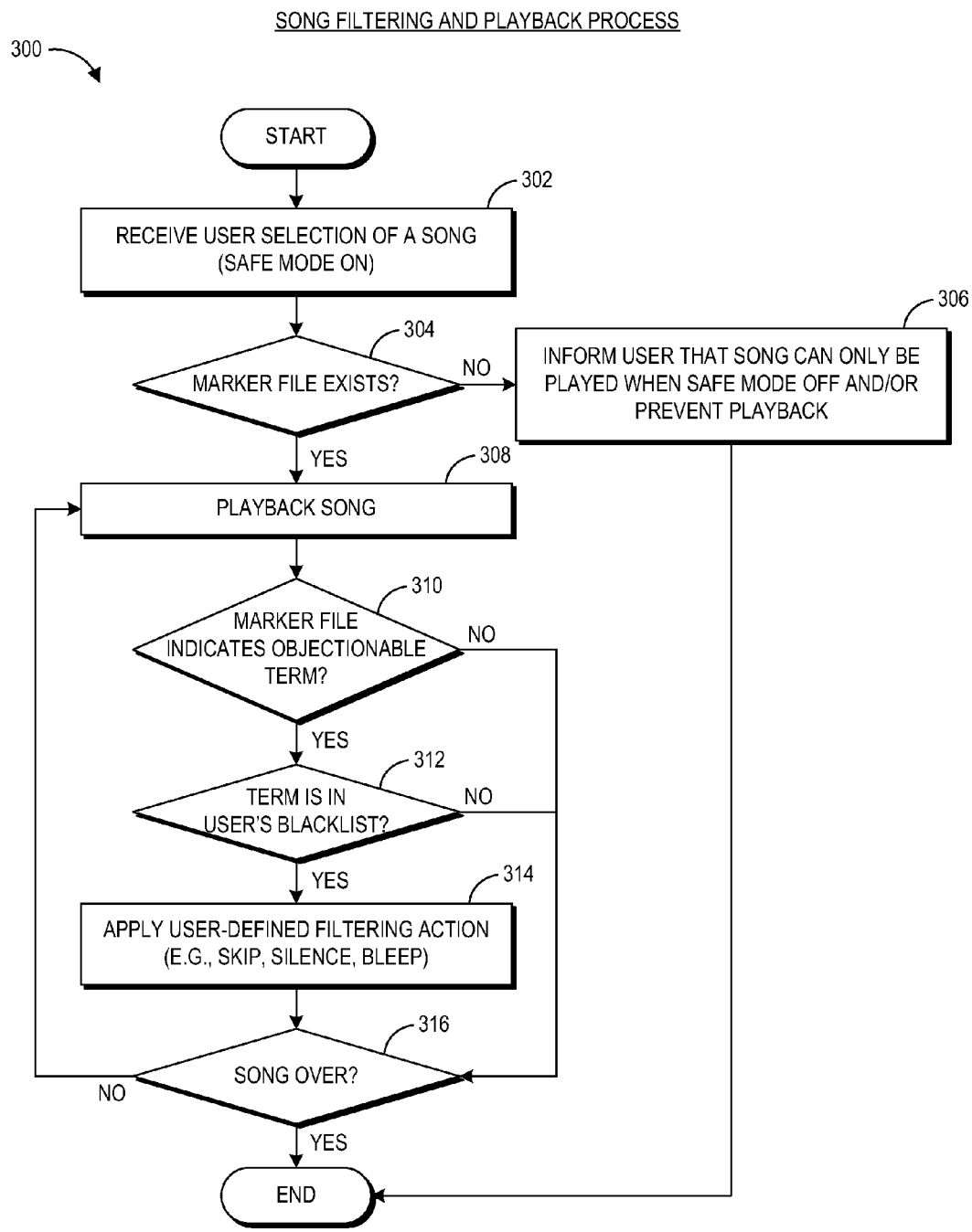
FIG. 3A depicts an example song filtering and playback process.

Turning to FIG. 3A, an example song filtering and playback process 300 is shown. The process 300 may likewise be implemented by components of the computing environment 100, such as by the language filtering client 110. For convenience, the process 300 will be described as being implemented by the language filtering client 110, although the process 300 may be implemented by any computing device.

At block 302, the language filtering client 110 receives a user selection of a song via, for example, the audio/video player 114. In the depicted embodiment, the safe mode is on, indicating in an embodiment that the user has used the preferences module 112 to select a safe mode to filter objectionable content. At block 304, the language filter 116 determines whether a marker file exists for or is otherwise associated with the selected song. In an embodiment, the language filter 116 can access the content library 118 stored at the language filtering client 110 to determine whether the marker file exists for the song. Alternatively, the language filter 116 can access the marker file creation system 120 over the network 108 to download the marker file for the song or otherwise determine whether the marker file is available from the system 120.

If the marker file does not exist for the song, at block 306 the language filter 116 informs the user that the song can only be played when safe mode is off and/or can prevent playback of the song. Thereafter, the process 300 ends. The user may then, for instance, access the preferences module 112 to disable the safe mode if desired. Alternatively, in another embodiment, the safe mode may be password protected so that a guardian of the user (such as a parent) can selectively choose whether safe mode is to be enabled for the user, thereby enabling the guardian of the user to establish limits for that user.

If a marker file exists at block 304, then the process 300 proceeds to block 308, where the player 114 plays back the song. As the song is being played back at block 310, the language filter 116 determines whether the marker file indicates an objectionable term at the point of the song currently being played by the player 114. If there is no objectionable term, the process 300 proceeds to block 316 where it is determined whether the song is over. If the song is not over, then the process 300 loops back to block 308, where the song continues to be played back. If an objectionable term is encountered in the marker file, then the process 300 proceeds to block 312 where the language filter 116 determines whether the term is in the user's blacklist. In an embodiment, the user's blacklist or list of objectionable terms includes a subset of the objectionable terms in the marker file for the song. Thus, the objectionable terms in the marker file can be a superset of the user's blacklist, or at least may include some different terms from the user's blacklist. The content of the user's blacklist can include all the objectionable terms in the marker file in some embodiments.

If the term is not in the user's blacklist, then the process 300 proceeds to block 316 described above. Otherwise, the process 300 proceeds to block 314, where the language filter 116 applies a user-defined filtering action such as a skip, silence, or play a bleep sound. The user-defined filtering action could be defined via the preferences module 112, which can enable a user to select whether to skip the objectionable word for the time duration noted in the marker file or otherwise splice the song so as to delete the objectionable word from the song. Alternatively, another option a user may select is to silence the word or create a bleeping sound. However, a silence or bleep can interrupt the rhythm or flow of the song. Thus, in an embodiment skipping the objectionable word may be set as a default option to preserve rhythm or song flow. Providing options for the user to select whether to skip, silence, or bleep terms is optional. Thereafter, the process 300 again proceeds to block 316. If the song is over, the process 300 ends.

It should be noted that in other embodiments, it is possible for the language filter 116 to skip a song entirely rather than filtering objectionable content from the song. This embodiment may be useful, for example, for playlists and streaming media embodiments. If a marker file indicates that a song includes objectionable content, for example, then the language filter 116 may prevent playback of that song or skip to another song. For instance, Pandora™ provides an online listening service whereby a user can select a channel to listen to continuously streaming audio comprising one song followed by another. If a marker file is detected by the language filter 116 as corresponding to a song having objectionable content, the language filter 116 can request the song to be skipped and go to the next song.

Figure 3B:
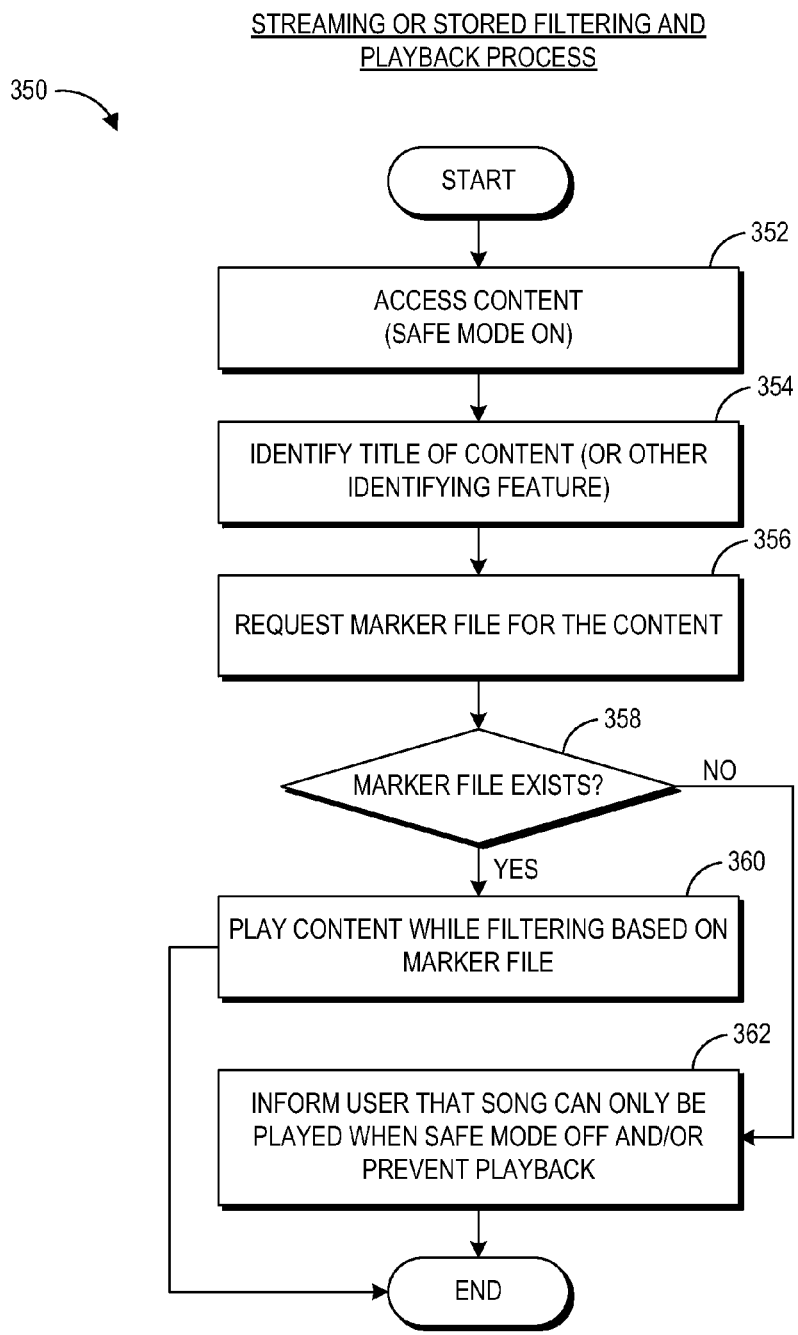
FIG. 3B depicts an example streaming or stored content filtering and playback process.
Figure 7:
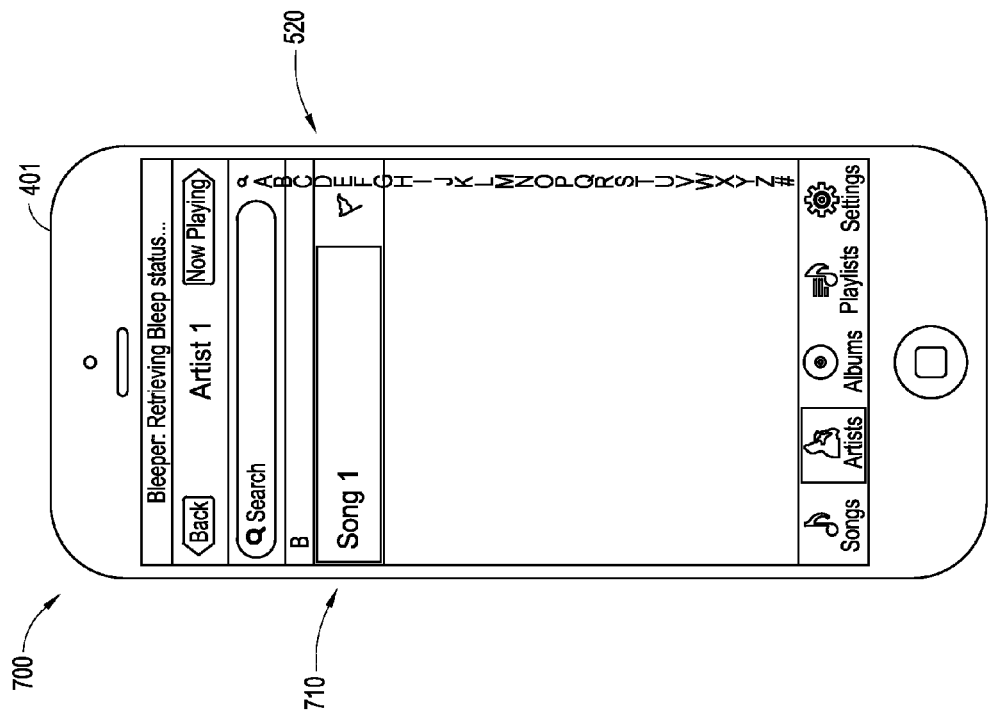

Streaming media and other content are described in greater detail in the process 350 shown in FIG. 3B. Like the other processes show and described herein, the process 350 may be implemented by components of the computing environment 100 such as the language filtering client 110. It should be understood, however, that other computing devices could also implement the process 350 shown.

At block 352, the player 114 accesses content which may include streaming media (or alternatively media stored on a computer readable storage medium such as a DVD or Blu-ray™ disc). Safe mode is again on in the depicted embodiment. At block 354, the language filter 116 identifies the title of the content such as the title of a song or a movie or another identifying feature of the content (such as an album or artist). At block 356, the language filter 116 uses this information to request a marker file from the system 120. If the marker file exists, as determined at decision block 358, then the language filter 116 can download the marker file and play the content. Filtering can be performed on the content based on the marker file at block 360. Otherwise, the language filter can inform the user that the song or content can only be played when the safe mode is off and/or prevent playback at block 362.

Sometimes, when media is streamed to a user device, the media may be received at the user device before the marker file is received. In this situation, the language filtering client 110 (e.g., the player 114) can buffer the media until the marker file is received (or until enough of the marker file is received to begin filtering the media).

IV. Example User Interfaces

FIGS. 4 through 15 depict example user interfaces 400-1500 that can be generated by the language filtering client 110. These user interfaces are shown implemented in a smartphone 401, which is an example user computing device. The user interfaces 400-1500 shown are examples of user interfaces and include user interface controls for selecting songs, artists, albums and playlists as well as identifying songs that have an associated marker file. Further, the user interfaces 400-1500 also include features for playing back songs while implementing the language filtering features described above. Each of the user interfaces 400-1500 shown may be implemented as an application or app installed on the user device 401. Alternatively, the user interfaces 400-1500 may be implemented as web pages or other network documents accessed by the user device 401 or combinations of the same.

The user interface controls shown in any of the user interfaces described herein are merely illustrative examples and can be varied in other embodiments. For instance, buttons, dropdown boxes, select boxes, text boxes, check boxes, slider controls, and other user interface controls shown may be substituted with other types of user interface controls that provide the same or similar functionality. Further, user interface controls may be combined or divided into other sets of user interface controls such that similar functionality or the same functionality may be provided with different looking user interfaces. Moreover, each of the user interface controls may be selected by a user using one or more input options, such as a mouse, touch screen input, or keyboard input, among other user interface input options.

Turning to FIG. 4 specifically, the user device 401 is shown implementing a user interface 400 that depicts a playlist 410, from which a user can select to view songs in user-created playlists. At the top of the user interface 400, a status message 402 is shown. This status message 402 indicates that the language filtering client 110 (entitled "Bleeper" in this example) is retrieving "bleep status." In an embodiment, this status message 402 indicates that the language filtering client 110 is communicating with the marker file creation system 120 to download marker files for songs in the content database of the language filtering client 110.

FIG. 5 shows another user interface 500, where the user has searched for songs with a search box 512. In response to the search query, the client 110 has received a list of songs 510. A soft keyboard 514 is shown that enables the user to select or type into the search box 512. Next to each song 510 is shown a flag 520. The flags 520 can be shown in two different colors in one embodiment. If the flag 520 is green, that may indicate that the language filtering client 110 has a marker file available for that song either stored locally at the user device 401 or stored at the server of the marker file creation system 120. If the flag 520 is red, this may indicate that a marker file is either not stored on the user device 401 or is not available at the server of the marker file creation system 120. Thus, the flags 520 can indicate whether the songs are safe to play.

In another embodiment, a green flag is also shown for a song that has no objectionable content (e.g., its marker file is empty). Further, flags are merely one example type of icon that can be used to represent whether a marker file is downloaded, and another icon can be used in other embodiments. In addition, the indication of whether a marker file exists for a song can be presented in ways other than by showing an icon. For instance, a song's title can be shown in a different color (such as a green or red) to indicate the presence or absence of a marker file (respectively). Similar colors and flags can be used to indicate whether an entire album has marker files, whether an entire set of songs associated with an artist has marker files, or whether an entire playlist has marker files.

A user may select any of the songs 510 in FIG. 5 to play back the songs. For example, the user device 401 can include a touch screen capability that enables the user to tap on one of the songs 510 to play back the songs.

Figure 6:
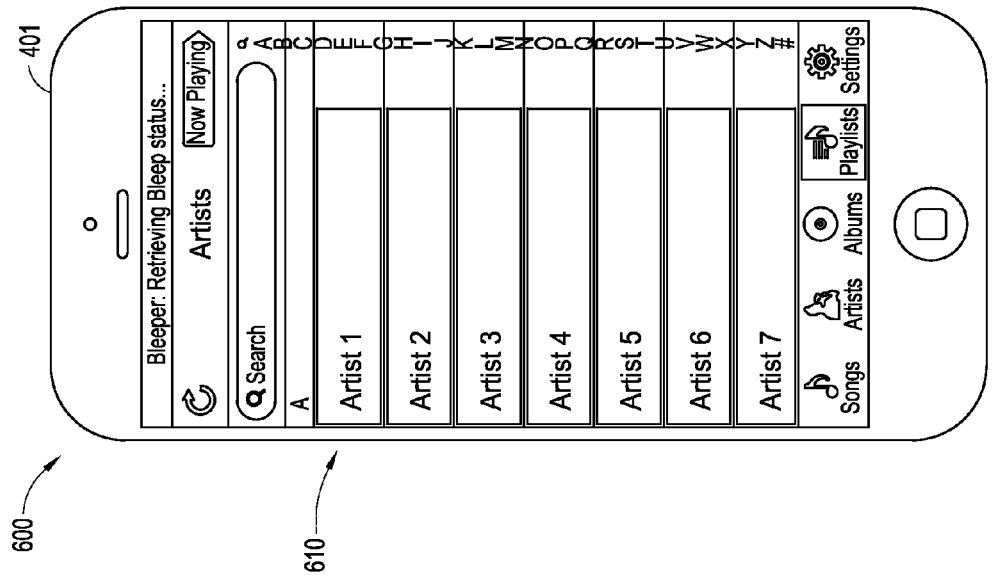
Figure 9:
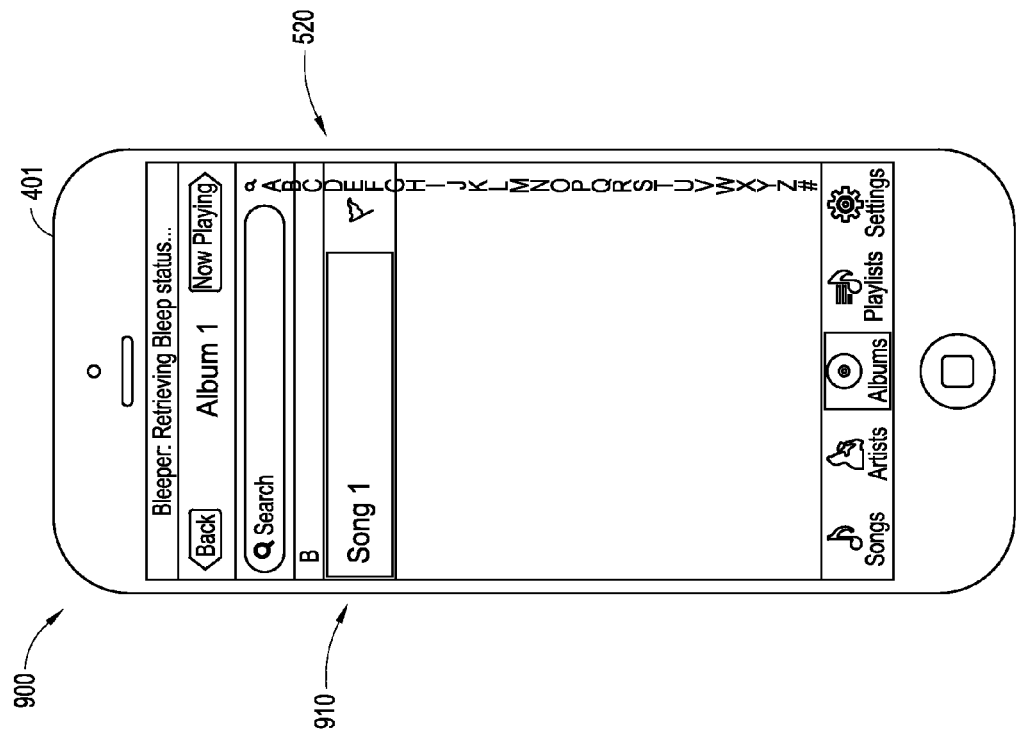
Figure 8:
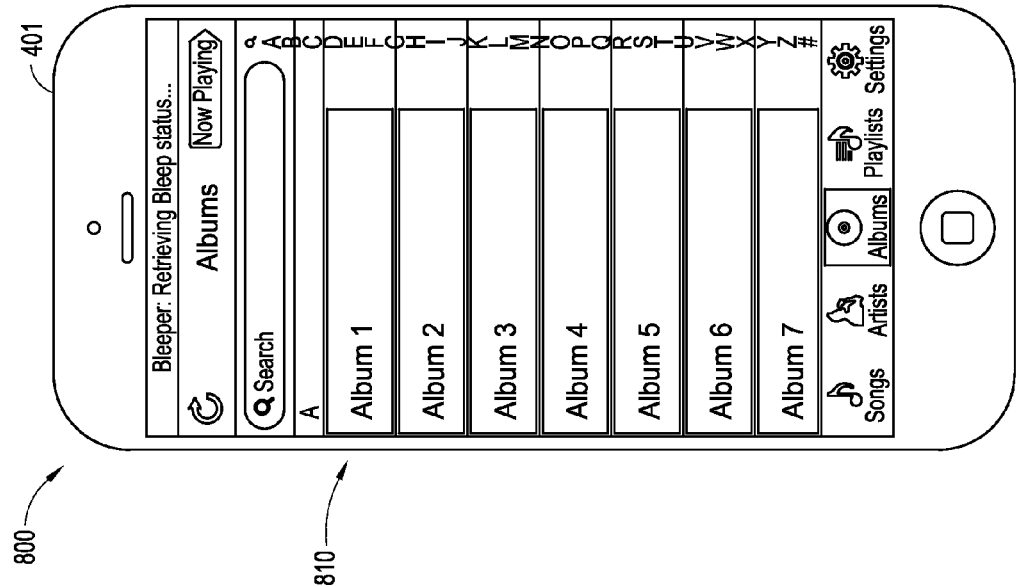

There are other options available for identifying songs to be played back. For instance, FIG. 6 depicts artists 610, which can be selected by a user to identify songs associated with that artist as shown e.g., in FIG. 7, where a song 710 is associated with a selected artist from FIG. 6. Similarly, in FIG. 8 a user can select from different albums 810 stored at the user device 401 to view songs 910 associated with the selected album as shown in FIG. 9.

FIG. 10 depicts an example user interface 1000 where a user has selected a song 1010 for playback, but the song's flag 520 is red (or another color), indicating that the song does not have an associated marker file or is otherwise unsafe. In response to the user selection of the song 1010, a popup window 1020 is shown that instructs the user to turn off safe listening mode from settings to play the song. The user can select an okay button 1022 in the popup window 1020 to dismiss the popup window 1020. The user may then choose to view the settings to access the functionality of the preferences module 112 to turn off the safe listening option (see FIG. 12). Alternatively, the user can wait until a marker file is downloaded for the song or optionally request the marker file from the marker file content creation system 120.

FIG. 11 shows another user interface 1100 that shows music player functionality of the player 114 once a safe song has been selected. In an embodiment, language filtering by the language filter 116 is performed transparently to the user so that when the user presses play in the user interface 1100, the user then does not need to perform any further action to cause the filtering to take place. Such filtering is performed programmatically and automatically in an embodiment in response to a user's selection of a song.

Figures 12, 13:
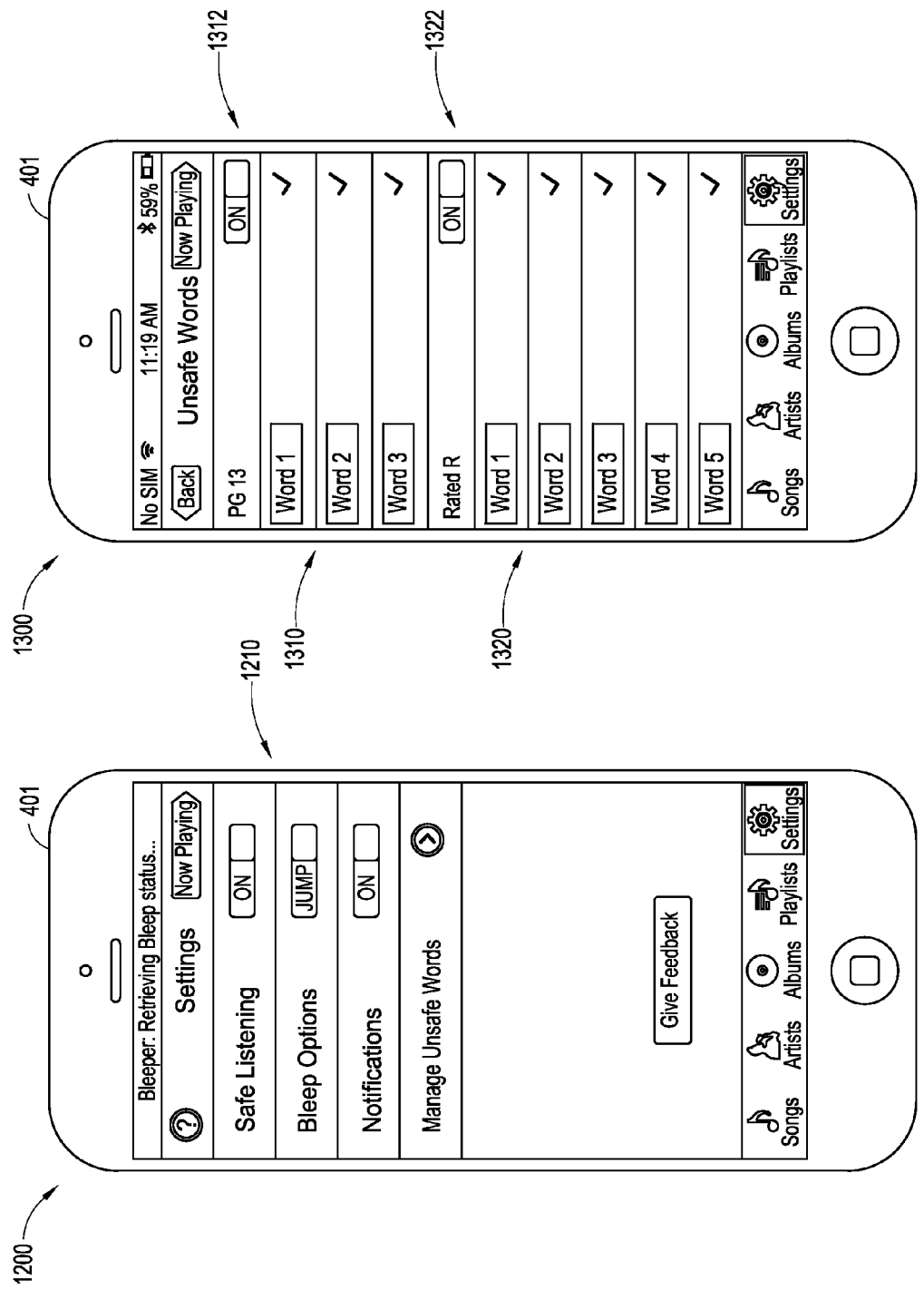

Turning to FIG. 12, a user interface 1200 is shown that provides user interface controls 1210 for setting different options, including a safe listening option as described above (e.g., safe mode), bleep options as described above which can allow a user to select to jump, skip, silence or otherwise bleep when an objectionable word is encountered, as well as notifications. The notifications can include push notifications provided to the user device 401 by the system 120 that indicate whether a song is ready for safe play. For instance, notifications of when a marker file is downloaded for a song can be presented by the language filtering client 110.

FIG. 13 depicts a user interface 1300 that shows a list of unsafe words that can be edited by a user. The list of unsafe words includes two portions 1310 and 1320. The top portion 1310 of the list includes PG-13-rated words, and the bottom portion 1320 includes rated R-rated words to reflect that the rated R words are perhaps more objectionable to some people than the PG-13 words. Selector switches 1312 and 1322 allow a user to select whether to filter out one or both of the PG 13 and rated R words. Although the terms PG-13 and rated R are used herein in a similar manner to the MPAA ratings for film and may correspond to the standards for such films, they need not do so. Instead, the PG-13 words may generally be less objectionable to many people than the rated R words. Whether a word ends up on the PG-13 or R lists may be determined by the workers (of the worker systems 130), which determination may be made based on the master marker file described above.

Other appellations may be used to classify objectionable words into different levels including more than two levels as shown. Alternatively, a single list of objectionable words may be maintained by the language filtering client 110. As described above, the user can delete any of the words from the list. In addition, the user can add additional words that the user finds objectionable. In yet another embodiment, the unsafe words list may include another type of unsafe words—religious words which the user may find objectionable for certain songs. If the user is listening to religious-based content, the user may wish to turn off the religious words filter and may do so using an interface such as the user interface 1300.

Figure 14:
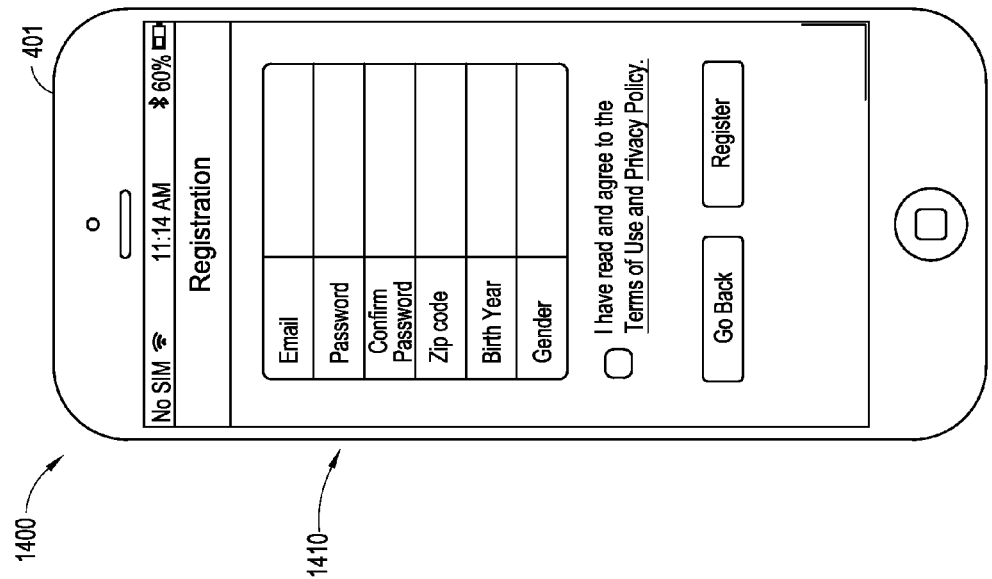

FIG. 14 depicts another user interface 1400 that includes user interface controls 1410 for a user to register with the marker file creation system 120 so that the user can obtain marker files for songs on the user's device. In addition, in certain embodiments the language filtering client 110 enables the user to download licensed songs with associated marker files from the marker file creation system 120.

Figure 15:
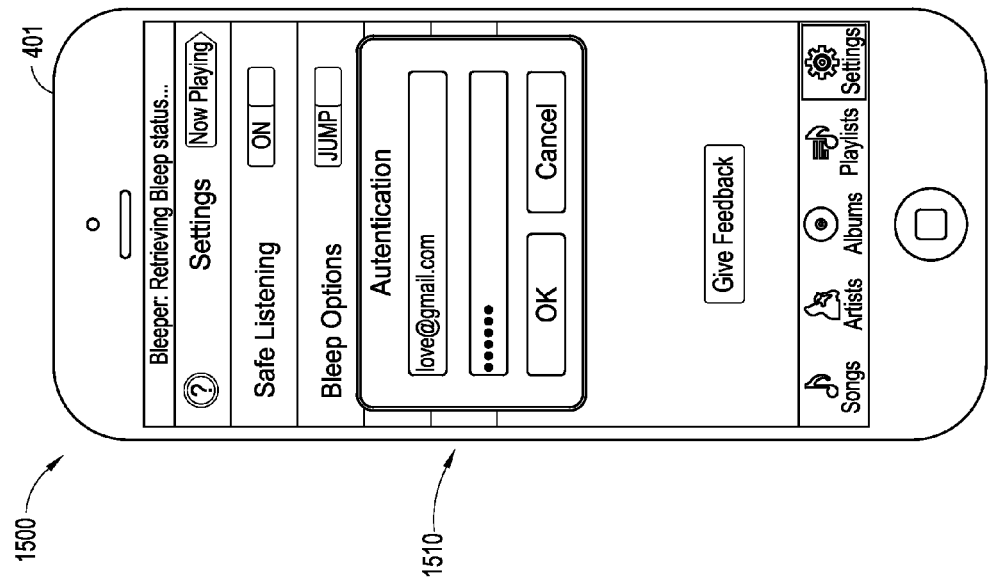

FIG. 15 shows a user interface 1500 where an authentication dialogue 1510 is shown that includes a user name and a password that may need to be entered in order to change the settings shown in FIG. 12. As described above, a parent or guardian may decide to set a user name and password to prevent a child from changing the settings shown in FIG. 12.

Figure 16:
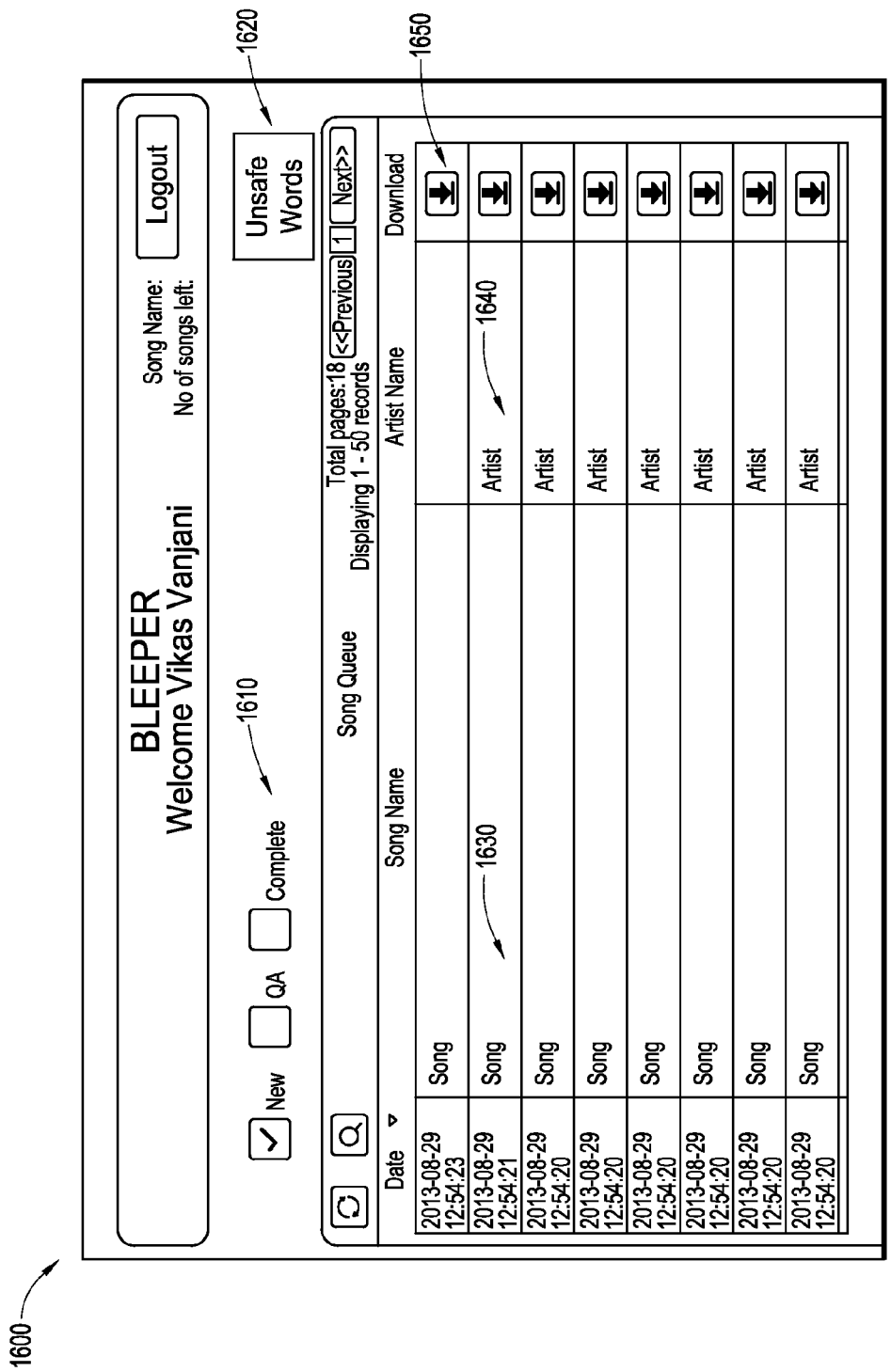
FIGS. 16 and 17 depict example marker file creation user interfaces.
Figure 17:
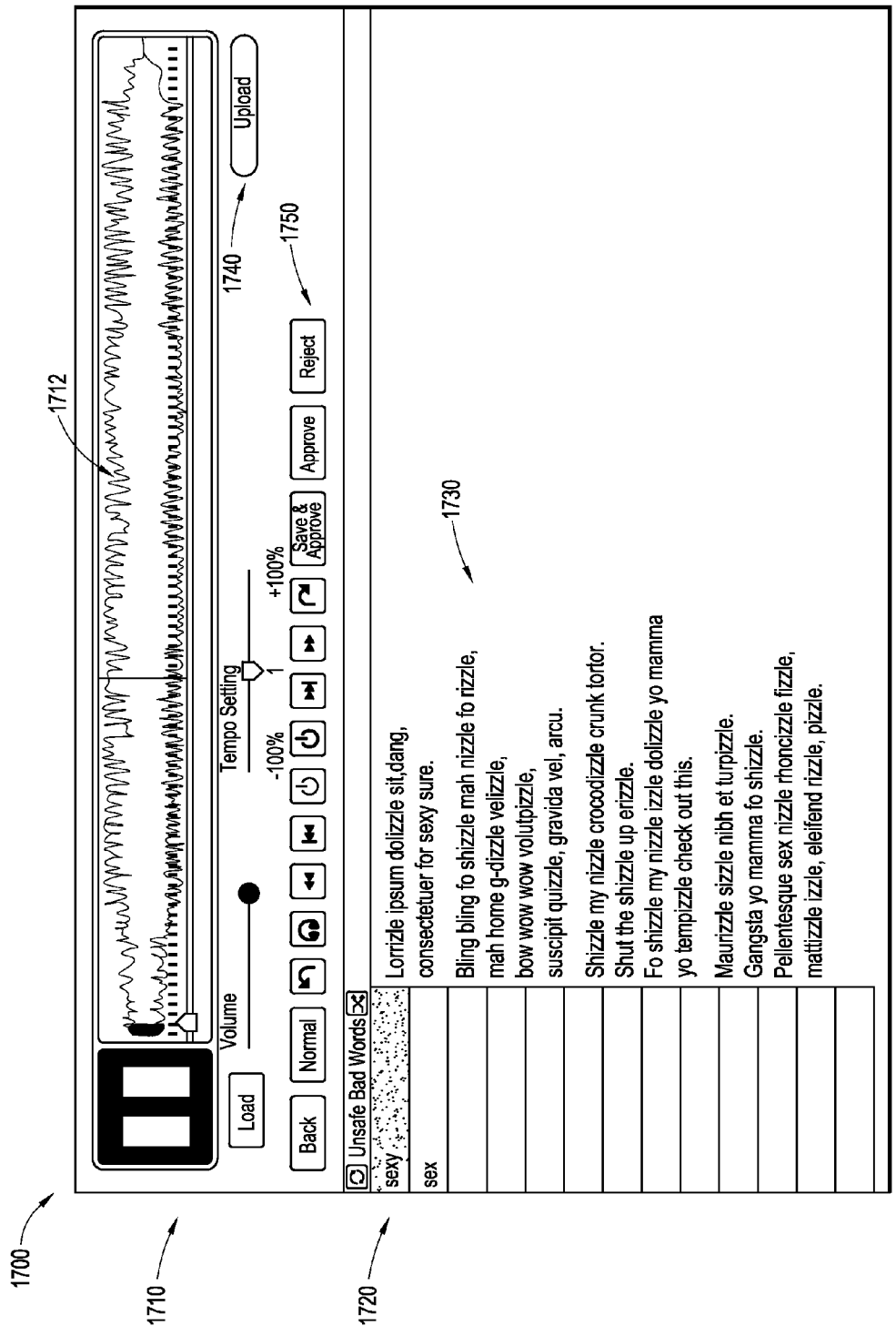

Turning to FIGS. 16 and 17, example worker user interfaces 1600 and 1700 are shown, which may be accessed by the worker systems 130 when communicating with the marker file creation system 120. In FIG. 16, the user interface 1600 includes controls 1610 for selecting a new edit of the song, a quality assurance (QA) edit of a song, and whether to mark a song as complete. Different workers may be assigned quality assurance tasks and other workers may be assigned to initial review of a song. Thus, for example, a worker may initially identify words in a song and their time markers and then a second worker or multiple workers may perform quality assurance on the song marker file. A list of songs 1630 is also shown, which the worker can select from and download (e.g., under license) using button 1650. The songs are shown by song name and artist name 1640. Further, a master list of unsafe words 1620 can be accessed with the button 1620 as shown.

Turning to FIG. 17, if one of the songs 1630 in FIG. 16 is selected, the worker may be presented with the user interface 1700. Different controls 1710 enables the user to selectively play, pause, change the volume, address tempo settings to slow down or speed up a song, view the waveform 1712 of the song, and the like. Lyrics of the song 1730 are also shown, as well as unsafe bad words in a list 1720 shown to the left of the lyrics 1730. These words may be populated by the worker while reviewing the song, and the worker may also select times markers as physical locations on the sound wave graph 1712 to mark where those unsafe words occur in the song. Further, quality assurance buttons 1750 are provided for the worker to save and improve previously edited lists or marker files.

FIG. 18 depicts an example marker file 1800 that is a table including a list of song names, corresponding artists, objectionable words found in those songs, their start times, end times and durations. This is an example of a marker file that can be downloaded to the language filtering client 110 and used to filter songs as described above.

Figure 19:
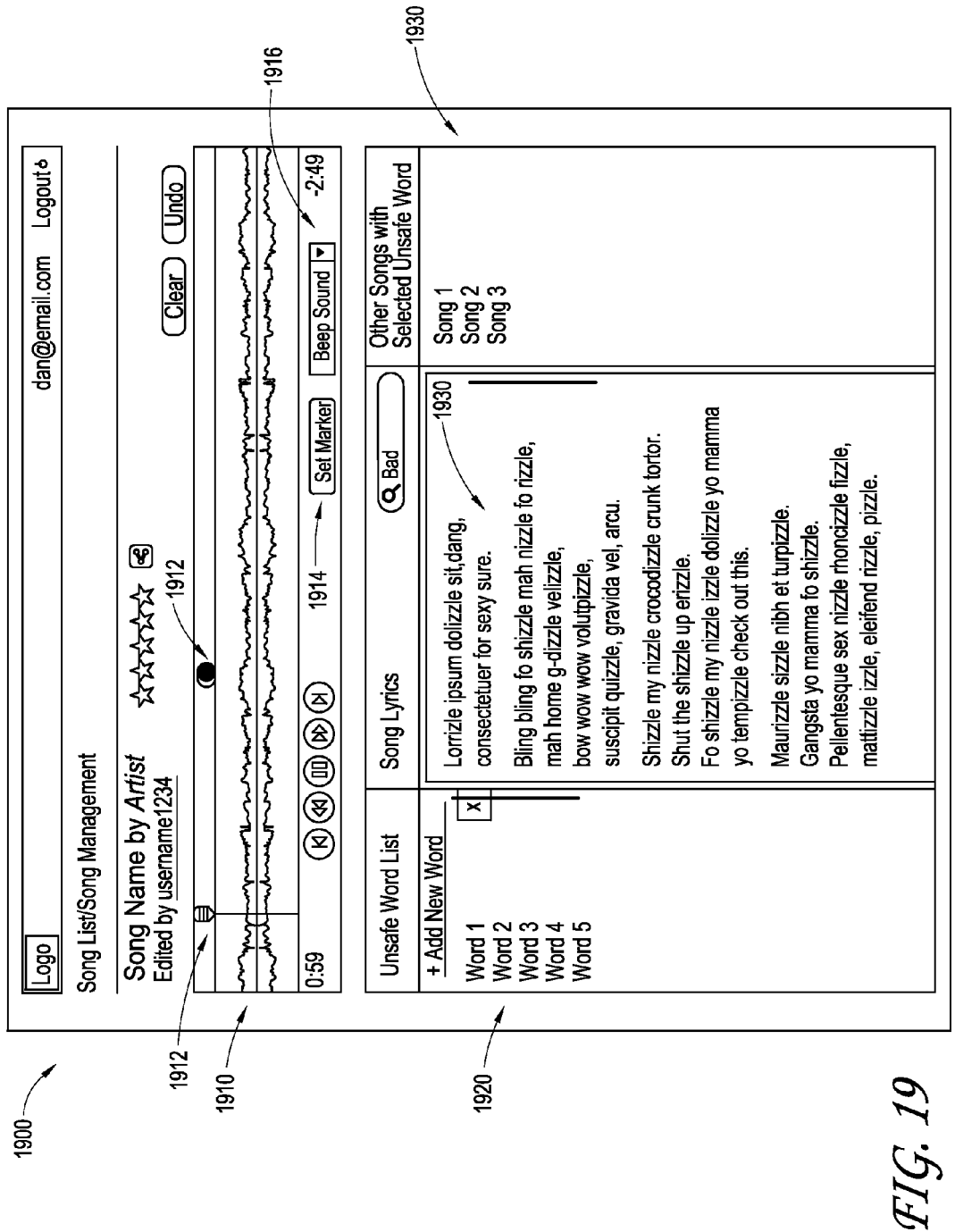
FIG. 19 depicts another example marker file creation user interface.

FIG. 19 depicts another example user interface 1900 similar to the example worker user interface like the worker interfaces 1600 and 1700 described above. The interface 1900 includes tools 1910 for selecting markers 1912 on an audio graph as well as control 1914 to set the markers. Also, a control 1916 is shown for a user to select the particular type of filtering to be performed whether it be skip, jump, silence or beep. This control 1916 can be used in place of giving users the option to select the type of filtering to perform. Further, the control 1916 can override a user's selection in one embodiment. An unsafe words list 1920 and lyrics 1930 are shown, as described above in FIGS. 16 and 17. A list of other songs with the selected unsafe word 1930 is also shown, which can enable the user to compare the current song with other songs to evaluate whether to flag objectionable content.

Turning to FIG. 20, an administrative user interface 2000 is shown with administrative features including controls 2010 for an administrative user to manage accounts of workers. These controls 2010 can allow the administrative user to manage worker account names, e-mails and other contact information, and the like.

V. Additional Embodiments

Other embodiments for detecting objectionable content in media may be used in place of or in addition to using the marker files described above. Voice recognition technology is one example of such an embodiment. A voice recognition system, including software and/or hardware, may be implemented in the language filtering client 110 or may be accessed remotely by the language filtering client 110. The voice recognition system can analyze media during playback to determine whether the media includes any objectionable terms. If so, the voice recognition system can output an indication to a user, such as that the media can be played only in safe mode, and/or can disable playback of the media, or may filter the media (e.g., based on user-specified objectionable terms as described above). The voice recognition system can also analyze media prior to playback and store an indication of whether the media includes any objectionable terms. Thus, during playback, the language filtering client 110 can simply lookup the stored indication of whether the media includes objectionable terms to determine to warn the user, stop playback, and/or filter playback.

Similarly, in another embodiment, the language filtering client 110 can access an audio fingerprinting system (either locally to the client or remotely) to determine whether the media includes any objectionable terms. Audio fingerprinting software can detect a song's title based on analyzing some portion (such as the initial few bars) of the song. The language filtering client 110 can use the audio fingerprinting system during playback to detect a song's title, then look up the song's title in a data store to determine whether the song is listed as having objectionable terms, and then warn the user, stop playback, or filter playback as described above.

VI. Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration.

A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for filtering objectionable content from audio, the system comprising:

a preferences module configured to output a user interface comprising functionality that enables a user to specify first objectionable terms to filter out from audio playback and to specify a type of filtering action to be performed on said first obiectionable terms, the filtering action selected from skipping the first objectionable terms, silencing the first objectionable terms, and outputting a sound to override the first obiectionable terms; and a language filtering client implemented at least in part by a hardware processor, the language filtering client configured to:

receive a user selection of an audio content item to be played;

access a marker file associated with the audio content item, the marker file comprising an indication of second objectionable terms used in the audio content item, the second objectionable terms comprising a subset of the first objectionable terms; and cause playback of the audio content item to occur;

filter out the subset of the first objectionable terms from the audio content item based on timing information associated with the second objectionable terms stored in the marker file, by at least applying a default filtering action of skipping the subset of the first objectionable terms unless the preferences module has received a user-specified preference to perform another type of filtering action other than said skipping, wherein said skipping the subset of the first obiectionable terms comprises deleting the subset of the first objectionable terms during said playback of the audio content item and splicing the audio content item before and after each of the deleted objectionable terms.

2. The system of claim 1, wherein the user interface further comprises functionality for the user to specify the first objectionable terms by selecting a filter level.

3. The system of claim 2, wherein the filter level comprises one or more of the following: a PG filtering level, a PG-13 filtering level, and an R filtering level.

4. The system of claim 1, wherein the user interface further comprises functionality for the user to specify the first objectionable terms by providing a text box in which the user can enter the first objectionable terms.

5. The system of claim 1, wherein the marker file comprises data representing start and stop times corresponding to the second objectionable terms in the audio content item.

6. The system of claim 1, wherein the marker file comprises data representing start times and duration times corresponding to the second objectionable terms in the audio content item.

7. The system of claim 1, wherein the language filtering content does not filter out selected ones of the second objectionable terms from the audio content item that are not in the first objectionable terms specified by the user.

8. The system of claim 1, wherein the language filtering module is further configured to access the marker file remotely from a server in response to receiving the user selection of the audio content item to be played.

9. The system of claim 1, wherein the audio content item comprises a song.

10. The system of claim 1, wherein the audio content item comprises audio from a video.

11. The system of claim 1, wherein the audio content item comprises a streaming audio file.

12. Non-transitory physical computer storage comprising instructions stored thereon that, when implemented by a hardware processor, cause the hardware processor to implement a system for filtering objectionable content from audio, the system configured to:
output a user interface comprising functionality that enables a user to specify first objectionable terms to filter out from audio playback and to specify a type of filtering action to be performed on said first obiectionable terms, the filtering action selected from skipping the first objectionable terms, silencing the first obiectionable terms, and outputting a sound to override the first objectionable terms;
receive a user selection of an audio content item to be played back;
access a marker file associated with the audio content item, the marker file comprising an indication of second objectionable terms used in the audio content item, the second objectionable terms comprising a subset of the first objectionable terms; and
cause playback of the audio content item to occur;
filtering out the subset of the first objectionable terms from the audio content item based on timing information associated with the second objectionable terms stored in the marker file, said filtering comprising applying a default filtering action of skipping the subset of the first objectionable terms unless a preference to perform another type of filtering action other than said skipping has been specified by a user,
wherein said skipping the subset of the first obiectionable terms comprises deleting the subset of the first objectionable terms during said playback of the audio content item and splicing the audio content item before and after each of the deleted objectionable terms.

13. The system non-transitory physical computer storage of claim 12, wherein the user interface further comprises functionality for the user to specify the first objectionable terms by selecting a filter level.

14. The non-transitory physical computer storage of claim 12, wherein the user interface further comprises functionality for the user to specify the first objectionable terms by providing a text box in which the user can enter the first objectionable terms.

15. The non-transitory physical computer storage of claim 12, wherein the language filtering content does not filter out selected ones of the second objectionable terms from the audio content item that are not in the first objectionable terms specified by the user.

16. A method of filtering objectionable content from audio, the method comprising:
under control of a physical computing device comprising digital logic circuitry:
receiving an identification of user-specified objectionable content to be filtered from media playback;
receiving a user selection of a type of filtering action to be performed;
receiving a user selection of audio content for playback;
identifying whether a marker file is associated with the audio content;
in response to determining that the marker file is not associated with the audio content, performing one or both of outputting an indication to the user and preventing playback of the song; and
in response to determining that the marker file is associated with the audio content, playing back the song while filtering the user-specified objectionable content from the song responsive to data stored in the marker file, said filtering comprising skipping the user-specified objectionable content using a splicing technique unless the user selection of the type of filtering action is a type of filtering action other than skipping.

17. The method of claim 16, wherein said receiving the identification of user-specified objectionable content to be filtered from media playback comprises receiving a user-specified level of filtering to be applied.

18. The method of claim 16, wherein said receiving the identification of user-specified objectionable content to be filtered from media playback comprises receiving specific terms from the user.

19. The method of claim 16, further comprising accessing the marker file remotely from a server in response to receiving the user selection of the audio content for playback.

20. The method of claim 19, further comprising receiving the audio content as streaming content and buffering the audio content at least until the marker file is received from the server.

21. A method of filtering objectionable content from audio, the method comprising:
under control of a physical computing device comprising digital logic circuitry:
receiving an identification of user-specified objectionable terms to be filtered from media playback;
receiving a user selection of a type of filtering action to be performed, the type of filtering action defining whether the objectionable terms are skipped or silenced during playback;
receiving a user selection of audio content for playback;
determining whether the audio content includes objectionable terms;
in response to determining that the audio content includes the objectionable terms, playing back the song while filtering the user-specified objectionable content from the song, said filtering being performed according to the user selection of the type of filtering action.

22. The method of claim 21, wherein said determining comprises accessing an audio fingerprinting system to identify the audio content as including the objectionable terms.

23. The method of claim 21, wherein said determining comprises accessing a voice recognition system to identify the audio content as including the objectionable terms.

24. The method of claim 21, wherein said determining comprises accessing a marker file to identify the audio content as including the objectionable terms.

* * * * *

UNITED STATES PATENT AND TRADEMARK OFFICE
CERTIFICATE OF CORRECTION

PATENT NO. : 8,831,953 B2
APPLICATION NO. : 14/151649
DATED : September 9, 2014
INVENTOR(S) : Vikas Vanjani Page 1 of 1

It is certified that error appears in the above-identified patent and that said Letters Patent is hereby corrected as shown below:

In The Specification

In column 6 at line 4, Change ".com))." to --.com).--.

In The Claims

In column 14 at line 13, In Claim 1, change "obiectionable" to --objectionable--.
In column 14 at line 16, In Claim 1, change "obiectionable" to --objectionable--.
In column 14 at lines 37-38, In Claim 1, change "obiectionable" to --objectionable--.
In column 15 at line 15, In Claim 12, change "obiectionable" to --objectionable--.
In column 15 at line 17, In Claim 12, change "obiectionable" to --objectionable--.
In column 15 at line 36, In Claim 12, change "obiectionable" to --objectionable--.
In column 15 at line 41, In Claim 13, before "non-transitory" delete "system".

Signed and Sealed this
Thirtieth Day of June, 2015

Michelle K. Lee
*Director of the United States Patent and Trademark Office*